US011527878B2

(12) United States Patent
Zhou et al.

(10) Patent No.: US 11,527,878 B2
(45) Date of Patent: Dec. 13, 2022

(54) HYBRID ARC FLASH MITIGATION SYSTEM

(71) Applicant: Eaton Intelligent Power Limited, Dublin (IE)

(72) Inventors: Xin Zhou, Wexford, PA (US); Brian E. Carlson, Gibsonia, PA (US); Brooke E. Lang, Pittsburgh, PA (US); Robert P. Griffin, Bradfordwoods, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 134 days.

(21) Appl. No.: 17/070,464

(22) Filed: Oct. 14, 2020

(65) Prior Publication Data

US 2022/0115859 A1    Apr. 14, 2022

(51) Int. Cl.
*H02M 1/00*   (2006.01)
*H02H 1/00*   (2006.01)
(Continued)

(52) U.S. Cl.
CPC ............ *H02H 1/0023* (2013.01); *H01H 9/38* (2013.01); *H01H 9/50* (2013.01); *H02H 3/08* (2013.01); *H01H 9/52* (2013.01)

(58) Field of Classification Search
CPC .......... H02H 1/0023; H02H 3/08; H01H 9/38; H01H 9/50; H01H 9/52; H01H 3/222
See application file for complete search history.

(56) References Cited

U.S. PATENT DOCUMENTS 6,104,106 A    8/2000  Partridge
7,570,465 B2   8/2009  Beatty, Jr. et al.
(Continued)

FOREIGN PATENT DOCUMENTS

CN    104871285 B    1/2018
CN    104604055 B    6/2019
(Continued)

OTHER PUBLICATIONS

USPTO, "Non-Final Office Action", for corresponding U.S. Appl. No. 17/070,475, dated Jan. 13, 2022, 25 pp.
(Continued)

*Primary Examiner* — Adolf D Berhane
*Assistant Examiner* — Afework S Demisse
(74) *Attorney, Agent, or Firm* — Eckert Seamans Cherin & Mellott, LLC

(57) ABSTRACT

A system including an arc flash sensor that detects an arc flash event and an arc flash mitigation device in communication with the sensor. The mitigation device includes a path of least resistance having a path input and a path output. The arc flash sensor is located downstream the output. The mitigation device includes an electro-mechanical switch between the input and the output and an actuator. The mitigation device also includes a bypass power switch device that includes a solid-state circuit interrupter and that conduct current between the input and the output in response to an open-circuit condition of the switch. A system controller is provided to generate a trigger to activate the actuator to generate the open-circuit condition of the switch, which causes the power switch device to interrupt a fault current associated with a fault event in response to detection of the arc flash event.

18 Claims, 9 Drawing Sheets

(51) Int. Cl.
 *H01H 9/38* (2006.01)
 *H01H 9/50* (2006.01)
 *H02H 3/08* (2006.01)
 *H01H 9/52* (2006.01)

(56) References Cited

U.S. PATENT DOCUMENTS

| | | |
|---|---|---|
| 7,646,575 B2 | 1/2010 | Weiher et al. |
| 7,778,013 B2 | 8/2010 | Bruski et al. |
| 7,791,846 B2 | 9/2010 | Roscoe et al. |
| 8,040,517 B1 | 10/2011 | Wu et al. |
| 8,054,594 B2 | 11/2011 | Wu et al. |
| 8,228,652 B2 | 7/2012 | Yanniello |
| 8,351,171 B2 | 1/2013 | Payack |
| 8,492,672 B2 | 7/2013 | Shea |
| 8,508,891 B2 | 8/2013 | Carlino et al. |
| 8,837,103 B2 | 9/2014 | Weiher |
| 8,861,144 B2 | 10/2014 | Shea et al. |
| 9,178,353 B2 | 11/2015 | Robbins |
| 9,240,682 B2 | 1/2016 | Sivakumar et al. |
| 9,325,167 B2 | 4/2016 | Kumfer et al. |
| 9,385,524 B2 | 7/2016 | Rowny, Jr. et al. |
| 9,478,675 B2 | 10/2016 | Behrends et al. |
| 9,502,188 B2 | 11/2016 | Devine |
| 9,570,901 B2 | 2/2017 | Shea et al. |
| 9,978,553 B2 | 5/2018 | Tomimbang et al. |
| 10,020,643 B2 * | 7/2018 | Zheng .................. H02B 13/065 |
| 10,096,993 B2 | 10/2018 | Taillefer et al. |
| 10,098,270 B2 | 10/2018 | Bugaris et al. |
| 10,320,176 B2 | 6/2019 | Bartonek et al. |
| 10,483,749 B2 | 11/2019 | Rival et al. |
| 10,553,382 B2 | 2/2020 | Lagree et al. |
| 10,613,146 B2 | 4/2020 | Burns et al. |
| 2007/0253124 A1 | 11/2007 | Zhou et al. |
| 2010/0254046 A1 | 10/2010 | Liu et al. |
| 2012/0105030 A1 * | 5/2012 | Chen .................... H02M 3/156 323/271 |
| 2012/0243137 A1 | 9/2012 | Lawler et al. |
| 2013/0027829 A1 | 1/2013 | Antoniazzi et al. |
| 2014/0217996 A1 * | 8/2014 | Peker .................. H02M 3/1582 323/271 |
| 2015/0280421 A1 | 10/2015 | Niwa et al. |
| 2016/0285259 A1 | 9/2016 | Shea et al. |
| 2018/0145496 A1 | 5/2018 | Zeller |
| 2019/0044316 A1 | 2/2019 | Hrncir et al. |
| 2019/0183733 A1 | 6/2019 | Ogimoto et al. |
| 2019/0195949 A1 | 6/2019 | Burns et al. |
| 2019/0348245 A1 | 11/2019 | Ricks |
| 2019/0363532 A1 | 11/2019 | von zur Muehlen et al. |
| 2019/0371561 A1 | 12/2019 | Ehrhardt et al. |
| 2019/0372339 A1 | 12/2019 | Burns et al. |
| 2020/0091711 A1 | 3/2020 | Shea et al. |
| 2020/0106256 A1 | 4/2020 | Lawrence |
| 2020/0211803 A1 * | 7/2020 | Manahan ................ H01H 9/168 |

FOREIGN PATENT DOCUMENTS

| | | |
|---|---|---|
| DE | 102017125310 A1 | 5/2019 |
| EM | 1709504 B1 | 3/2008 |
| EP | 2220666 B1 | 4/2012 |
| EP | 3 118 954 A1 | 1/2017 |
| EP | 2596517 B1 | 9/2018 |
| JP | 5890635 B2 | 3/2016 |
| KR | 100802312 B1 | 2/2008 |
| KR | 20190005954 A | 1/2019 |
| WO | 2007054811 A2 | 5/2007 |

OTHER PUBLICATIONS

"Arcflash Reduction Maintenance System," Eaton, Publication No. SA00804001E / Z12812, Mar. 2013.
European Patent Office, "International Search Report and Written Opinion" from corresponding International (PCT) application No. PCT/EP2021/025397, dated Jan. 12, 2022, 13 pp.

* cited by examiner

HYBRID ARC FLASH MITIGATION SYSTEM

BACKGROUND

The document describes systems and methods that are directed to electrical power protection systems and methods and, more particularly, to a hybrid arc flash mitigation system to protect maintenance personnel and electrical power equipment.

Arc flash events can cause significant damage to power distribution systems such as switchgear and panelboards, as well as personnel injuries. Circuit breakers and fuses can be used in switchgear to provide protection when there is a short circuit fault. However, current protection systems have a relatively long response time to interrupt propagating hazardous currents associated with a short circuit fault and eliminate arc flash events, especially when it is a fault caused by low level overcurrent.

Some prior art systems exist that create a bolted short circuit upstream, which transfers the fault current from the arc flash to the short circuit path quickly. However, such systems may cause a lot of thermal and mechanical stress (due to high fault current) to the electrical system and its components.

Other protection systems can provide an arc flash elimination response (such as within 2 milliseconds (ms)) upon the detection of an arc flash event by current and light sensors where the detection requires 2 ms. However, commutation of the current from the arc flash event downstream is generally limited by the distance (i.e. impedance) between the protection system and arc flash event location.

SUMMARY

Some embodiments of a system may include an arc flash sensor configured to detect an arc flash event and an arc flash mitigation device in communication with the arc flash sensor. The arc flash mitigation device may include a path of least resistance having a path input and a path output. The arc flash sensor is located downstream of the path output. The arc flash mitigation device may include an actuator and an electro-mechanical switch between the path input and the path output. The arc flash mitigation device may include a bypass power switch device that includes a solid-state circuit interrupter and that is configured to conduct current between the path input and the path output in response to an open-circuit condition of the switch. A system controller is provided to generate a trigger signal to activate the actuator to generate the open-circuit condition of the electro-mechanical switch, which causes the bypass power switch device to interrupt a fault current associated with a fault event, in response to detection of the arc flash event by the arc flash sensor.

In various embodiments, the arc flash sensor may include a plurality of sensors that include at least one optical sensor and at least one current sensor located downstream of the path output to detect the arc flash event. The system may further include a plurality of branch circuits. Each branch circuit is monitored by at least one optical sensor and at least one current sensor.

In various embodiments, the arc flash mitigation device may further include a current sensor coupled upstream the path output to detect a high-current fault event. The system controller is also configured to generate a corresponding trigger signal to activate the actuator to generate the open-circuit condition of the electro-mechanical switch to cause the bypass power switch device to interrupt a fault current associated with the high-current fault event in response to detection of the high-current fault event by the current sensor of the arc flash mitigation device.

In some embodiments, the system controller is configured to control the bypass power switch device for a normal mode of operation, an arc flash reduction mode or both. In the normal mode of operation, the electro-mechanical switch is set in a closed-circuit condition by the system controller. In the arc flash reduction mode of operation, the electro-mechanical switch is set to an open-circuit condition and the bypass power switch device is in an "ON" state.

In various embodiments, the bypass power switch device may include a first transistor that includes an emitter; a second transistor that includes an emitter connected to the emitter of the first transistor; and a first voltage-dependent resistor having a first side connected to a collector of the first transistor and a second side connected to a collector of the second transistor. The collector of the first transistor may be connected to the path input. The first transistor and the second transistor form a transistor pair.

In various embodiments, the bypass power switch device may further include a third transistor that includes an emitter; a fourth transistor that includes an emitter connected to the emitter of the third transistor; and a second voltage-dependent resistor having a first side connected to a collector of the third transistor and a second side connected to a collector of the fourth transistor. The collector of the third transistor is connected to the collector of the second transistor, and the collector of the fourth transistor is connected to the path of least resistance between the output terminal of the switch and the path output. The third transistor and the fourth transistor from a second transistor pair.

In various embodiments, the system may include a housing for housing the switch, the path of least resistance, the bi-directional bypass power switch device and the system controller. The housing may have the form factor of a molded case circuit breaker or an air circuit breaker.

In various embodiments, the arc flash mitigation device may further include an electro-mechanical switch device that includes the electro-mechanical switch. The electro-mechanical switch device includes a vacuum interrupter. The actuator includes a Thompson coil or piezo-electric actuator connected to the vacuum interrupter.

In various embodiments, the bypass power switch device may include a cooling device.

In various embodiments, the system further includes a plurality of branch circuits downstream of the arc flash mitigation device. Each of the branch circuits includes an associated circuit breaker. Each of the circuit breakers is configured to open upon detection of a rated fault current. Each of the circuit breakers is configured to, after opening in response to detection of the rated fault current, send a reclose signal to the system controller. The system controller is further configured to, upon receipt of a reclose signal from a circuit breaker: a) determine whether the arc flash event occurred downstream of the circuit breaker that sent the reclose signal; and b) upon confirming that the arc flash event occurred downstream of the circuit breaker that sent the reclose signal, trigger the actuator that causes the electro-mechanical switch to reclose.

Some embodiments of a method may include protecting, by an arc flash mitigation device, at least one electrical circuit downstream or upstream the arc flash mitigation device. The arc flash mitigation device includes an actuator, electro-mechanical switch in a path of least resistance between a path input and the path output and bypass power switch device that includes a solid-state circuit interrupter coupled to the path of least resistance. The method includes detecting, by an arc flash sensor, an arc flash event downstream of the path output. The arc flash sensor is in communication with the arc flash mitigation device. The method includes triggering, by the arc flash mitigation device, the actuator to open the electro-mechanical switch in the path of least resistance in response to detection of the arc flash event by the arc flash sensor; and interrupting a fault current representative of the detected arc flash event by the bypass power switch device of the arc flash mitigation device.

In various embodiments, a system may include a plurality of branch circuits where each of the branch circuits includes an associated circuit breaker and an arc flash mitigation device located upstream the plurality of branch circuits. The arc flash mitigation device may include a path of least resistance having a path input and a path output and an electro-mechanical switch between the path input and the path output. The arc flash mitigation device may include a bypass power switch device that includes a solid-state circuit interrupter and that is configured to conduct current between the path input and the path output in response to an open-circuit condition of the electro-mechanical switch and a current sensor configured to measure an amount of current at the path output to detect a high-current fault event associated with a fault current flowing at a location in the system. The arc flash mitigation device may include a system controller configured to generate a trigger signal to cause the solid-state circuit interrupter to interrupt the fault current associated with the high-current fault event in response to detection of the high-current fault event by the current sensor, where the high-current fault event is of a level that is at least a multiple of a rated current of one or more of the circuit breakers of the branch circuits.

In various embodiments, the system may include an arc flash sensing system in communication with the system controller. The arc flash sensing system may include a plurality of arc flash sensors that include at least one optical sensor and at least one current sensor located downstream of the path output to detect an arc flash event, where each of the plurality of branch circuits is monitored by at least one optical sensor and at least one current sensor.

In various embodiments, the system controller is also configured to generate a corresponding trigger signal to activate the actuator to generate the open-circuit condition of the electro-mechanical switch to cause the bypass power switch device to interrupt a fault current associated with the arc flash event in response to detection of the arc flash event by any one arc flash sensor of the arc flash sensing system.

In various embodiments, each of the circuit breakers is configured to open upon detection of its rated fault current. Each of the circuit breakers is configured to, after opening in response to detection of the rated fault current, send a reclose signal to the system controller. The system controller is further configured to, upon receipt of a reclose signal from a circuit breaker: a) determine whether the location in the system was downstream of the circuit breaker that sent the reclose signal; and b) upon confirming that the location in the system was downstream of the circuit breaker that sent the reclose signal, trigger the actuator to cause the electro-mechanical switch to reclose.

In various embodiments, the system may include a main circuit breaker connected to and upstream of the arc flash mitigation device and configured to provide electrical current to the plurality of branch circuits when the electro-mechanical switch is in either of a closed-circuit condition or the open-circuit condition.

In various embodiments, the bypass power switch device has a response time between 100 microseconds and 0.5 milliseconds to interrupt an arc flash event or a high-current fault event.

In various embodiments, the system may include an electrical circuit upstream the arc flash mitigation device, the electrical circuit is configured to conduct a maintenance procedure in at least one branch circuit of the plurality of branch circuits. The arc flash mitigation device includes a selective maintenance mode that causes the open-circuit condition of the electro-mechanical switch.

In various embodiments, the arc flash mitigation device further comprises an external control panel providing a user interface to select the maintenance mode.

DETAILED DESCRIPTION

Figure 1:
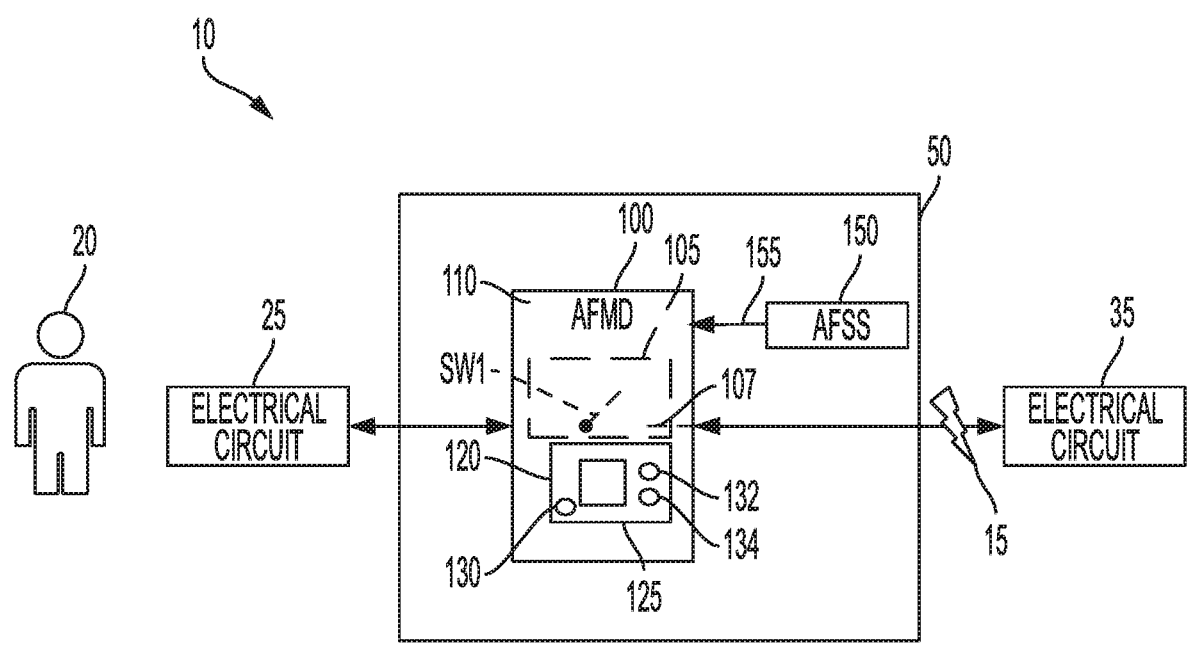
FIG. 1 illustrates a block diagram of a system employing a hybrid arc flash mitigation system.

Specific example embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items.

It will be understood that when an item is referred to as being "connected" or "coupled" to another item, it can be directly connected or coupled to the other item or intervening items may be present. For example, devices are "electrically connected" if a conductive path exists between the devices, even if the path includes one or more intermediate components.

As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

FIG. 1 illustrates a block diagram of a system 10 employing a hybrid arc flash mitigation system 50. The hybrid arc flash mitigation system 50 may include an arc flash mitigation device (AFMD) 100. Arc flash mitigation device 100 may include a housing 110 with a control panel 120. Control panel 120 may include a display panel 125 and an indicator 130. Indicator 130 may include a light indicator including a light emitting diode (LED), another type of light, or some other type of indicator device. By way of non-limiting example, activating arc flash mitigation device 100 may cause the light indicator 130 to illuminate. The light indicator 130 may allow personnel 20 to determine that arc flash mitigation device 100 is armed or "ON" before starting a maintenance procedure.

Display panel 125 may include a liquid crystal display (LCD) or LED display. Display panel 125 may include a touch sensitive user interface for receiving user input. Control panel 120 may include control buttons 132 and 134 such as for arming, disarming and/or resetting, respectively, arc flash mitigation device 100. One or more components of arc flash mitigation device 100 may include a solid-state design. The details of arc flash mitigation device 100 will be described in more detail in relation to FIGS. 2A-2B and 3.

Housing 110 houses protection electronic circuitry 105 of arc flash mitigation device 100, denoted in FIG. 1 as a dashed box. Protection electronic circuitry 105 may include a path of least resistance 107. In FIG. 1, path of least resistance 107 includes an electro-mechanical switch SW1, which will be described in more detail in relation to FIGS. 2A-2B. In FIG. 1, switch SW1 is "OPEN" forming an open-circuit within protection electronic circuitry 105 along the path of least resistance 107 when arc flash mitigation device 100 is activated or armed.

The system 10 may include an electrical circuit 35 that from time to time requires maintenance by personnel 20. Electrical circuit 35 may be a sub-component of an electrical power machine or an element of electrical distribution equipment. For example, the machine or equipment may include switchgear, a switchboard or a panelboard. Electrical circuit 35 may include an electrical power circuit. Personnel 20 may be required to connect an electrical circuit 25, such as an electrical tester or other device electrically to the electrical circuit 35 to perform a test or the other maintenance action. The electrical circuit 25 may generate an electrical current representative of a test signal. The electrical circuit 25 may expect a response or return signal from electrical circuit 35. As will be described in more detail below, arc flash mitigation device 100 when armed is configured to protect personnel 20 by interrupting a fault current of a fault event.

Hybrid arc flash mitigation system 50 may include an arc flash sensor system (AFSS) 150 that is configured to sense an arc flash event downstream of the arc flash mitigation device 100 such as a flash of light 15 or a current representative of an arc flash. In response to detecting the flash of light 15 from the arc flash, arc flash sensor system 150 provides a fault signal to arc flash mitigation device 100. The arc flash sensor system 150 may include an arc flash sensor. The detection of a flash of light and generation of the fault signal will occur more quickly than a standard current sensing branch breaker may act, and even more quickly than the system's main breaker may act. Arc flash mitigation device 100 also may include a current sensor, as will be described in more detail in relation to FIGS. 2A-2B and 3, to provide a (second) fault signal to arc flash mitigation device 100 in response to detecting a very high level of fault current in the system.

Housing 110 may include a form factor substantially similar to that of a circuit breaker, as will be described later in relation to FIGS. 4A-4C. Housing 110 may have a molded case. Packaging for arc flash mitigation device 100 in such a housing may find particularly advantageous application in providing arc fault mitigation in an electrical panelboard or other equipment at a location suited for installation of a standard form factor breaker. However, it should be understood, that the embodiments are not limited to such a form factor.

Figure 2A:
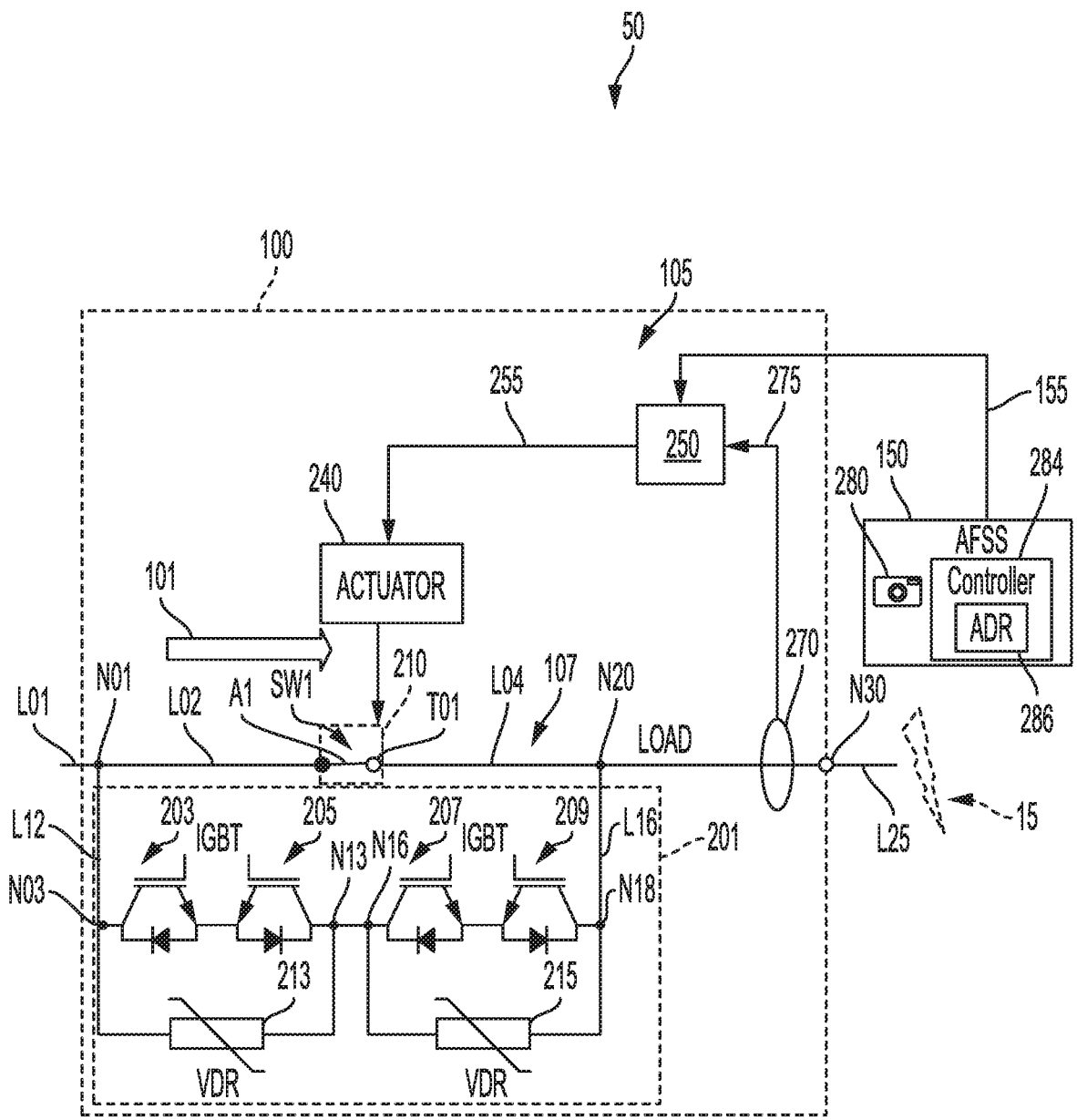
FIG. 2A illustrates a schematic diagram of a hybrid arc flash mitigation system with an arc flash mitigation device in a first mode of operation according to some embodiments.
Figure 2B:
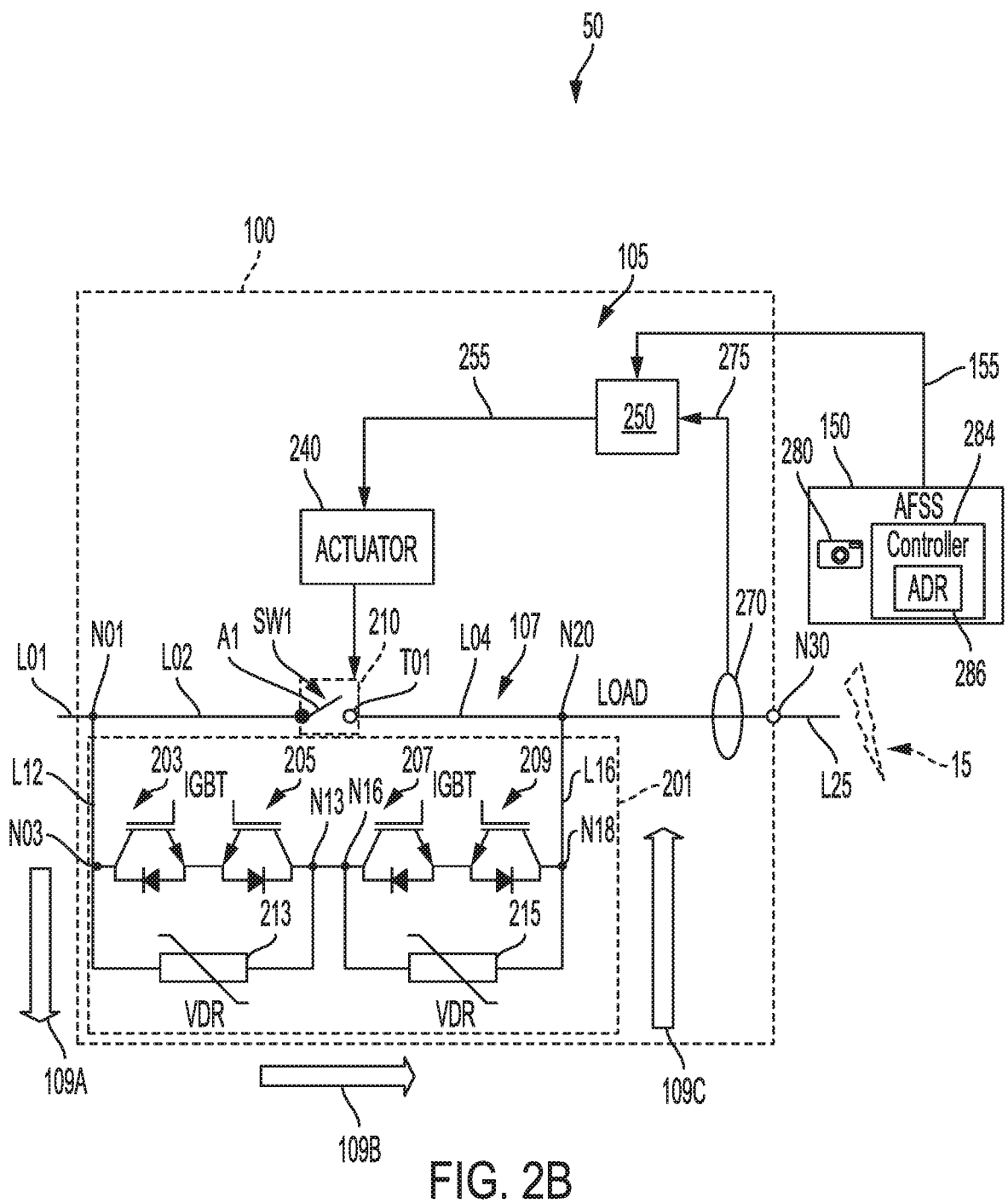
FIG. 2B illustrates a schematic diagram of the hybrid arc flash mitigation system with the arc flash mitigation device in a second mode of operation in according to some embodiments.

FIG. 2A illustrates a schematic diagram of hybrid arc flash mitigation system 50 with arc flash mitigation device 100 in a first mode of operation according to some embodiments. The first mode corresponds to a disarmed mode or normal mode of operation of protection electronic circuitry 105 with electro-mechanical switch SW1 "CLOSED" or in a closed-circuit condition. Switch SW1 is configured to have a lower on-resistance along the path of least resistance 107. FIG. 2B illustrates a schematic diagram of hybrid arc flash mitigation system 50 with arc flash mitigation device 100 in a second mode of operation in according to some embodiments. The second mode corresponds to an armed mode of protection electronic circuitry 105 with electro-mechanical switch SW1 "OPEN" or in an open-circuit condition, such that an open-circuit condition is formed along the path of least resistance 107; and an alternate bi-directional bypass path through an electronic bi-directional bypass power switch device 201 to vacuum interrupter 310 of electro-mechanical switching device 210 is created. The electro-mechanical switching device 210 is described in more detail in relation to FIG. 3. The path of least resistance 107 when switch SW1 is "CLOSED" may be bi-directional.

FIGS. 2A and 2B show the same arc flash mitigation device 100 structure, but in different modes of operation.

Bi-directional bypass power switch device 201 may include a solid-state circuit interrupter to interrupt the fault current of the fault event. In particular, bypass power switch device 201 is electrically connected to a system controller 250. Arc flash mitigation device 100 may be electrically connected to arc flash sensor system 150. Specifically, the arc flash sensor of the arc flash sensor system 150 may include a vision system 280 (FIGS. 2A and 2B) with one or more optical sensors 981 (FIG. 9), such as cameras or other image capture devices that can detect a flash of light 15. Arc flash sensor system 150 may include a flash sensor controller 284 that is separate from the controller 250 of arc flash mitigation device 100. The arc flash sensor of the arc flash sensor system 150 may include current sensors 982 (FIG. 9) of an Arcflash Reduction Maintenance System™ (ARMS) by Eaton® Corporation or another suitable current sensor system. In operation, an optical sensor 981 of the arc flash sensor system 150 is configured to visually detect illumination of the flash of light 15. In response to detection of the flash of light 15, arc flash sensor system 150 may communicate a (fault signal on communication line 155 to arc flash mitigation device 100. The fault signal on communication line 155 may denote detection of an arc flash event. The flash sensor controller 284 may include an arc detection relay 286 to send a subsequent signal to arc flash mitigation device 100 when optical sensor 981 (FIG. 9) senses a flash of light 15. Optionally, flash sensor controller 284 may use image processing, feature extraction or other machine learning algorithms to detect from an image a level of illumination representative of an arc flash event. In other embodiments, the optical sensor may detect or sense a level of illumination. Arc flash sensor system 150 will be described in more detail in relation to FIG. 9.

Upon receiving a fault signal on communication line 155 from arc flash sensor system 150, controller 250 may send a trigger signal on trigger conductor 255 to an ultra-fast actuator 240 in response to an arc flash event to open switch SW1. Ultra-fast actuator 240 will be ultra-fast in that is capable of acting more quickly than branch breakers and/or a main breaker of the system. For example, the switch SW1 may include contacts 313 and 323 (FIG. 3) of the electro-mechanical switching device 210 that will be forced to separate (open) to at least 1 millimeter (mm) distance within a few hundred microseconds (μs) driven by the ultra-fast actuator 240, as will be described in more detail in relation to FIG. 3. The controller 250 also may be responsive to a separate (first) fault signal from a current sensor 270 in-line of the path of least resistance 107, or to a signal from a current sensor that is connected to the arc flash sensing system 150 as described below. Controller 250 may send a trigger signal on trigger conductor 255 to actuator 240 in response to a high-current fault event detected by sensor 270. Hybrid arc flash mitigation system 50 includes an arc flash sensor that may include both an optical sensor and a current sensor to detect an arc flash event or high-current fault event, both of which may be referred to as a "fault event." The current sensor 270 may detect current along the path of least resistance 107 or upstream of the arc flash mitigation system 50 and be triggered by a current level that exceeds a threshold that corresponds to a high risk of an arc flash event 15. Hybrid arc flash mitigation system 50, using signals from either of the optical sensors or the current sensors, may take about 2 ms to detect and confirm via controller 250 the fault event, which will send a trigger signal to the electro-mechanical switching device 210. Within approximately 2.5 ms, the fault current of the fault event can be interrupted by hybrid arc flash mitigation system 50.

Current sensor 270 may detect a high-current fault (i.e., a fault event in which the current exceeds a threshold that is at least a multiple of a rated current of a downstream branch breaker and/or an upstream main breaker). Upon detection of a high-current fault event, the current sensor 270 may send a signal that may also cause controller 250 to send a trigger signal propagated along trigger conductor 255 to activate the actuator 240. The high-current fault event, which may be 2× the rated current of a branch breaker, 2.5× the rated current of a branch breaker, 6× the rated current of a branch breaker, or another multiple of another breaker's rated current, will represent a high degree of risk of an arc fault. In addition, hybrid arc flash mitigation system 50 can be used repetitively.

After bypass power switch device 201 interrupts the fault event, hybrid arc flash mitigation system 50 can communicate with the individual branch to determine which branch of a power system the fault resides on by getting current measurement levels, tripping that breaker (or receiving a signal from that breaker confirming it opens), and then restoring power through a power electronic device, as will be described in more detail in relation to FIG. 9.

Circuit breakers, sometimes referred to as circuit interrupters, include electrical contacts that connect to each other to pass current from a source to a load. The contacts may be separated by force in order to interrupt the delivery of current, either in response to a command or to protect electrical systems from electrical fault conditions such as current overloads, short circuits, and high or low voltage conditions. In some embodiments, electro-mechanical switching device 210 may be coupled to the ultra-fast actuator 240 to create the force to separate the contacts. An ultra-fast actuator 240 will be configured to open the switch SW1 to achieve at least 1 millimeter (mm) contact gap within a response time of approximately 0.5 ms. Electro-mechanical switching device 210 will be described in more detail in relation to FIG. 3.

The term "node" as used herein may refer to a connection or a connection location. As a point of reference, assume that node N01 on the path of least resistance 107 is an input node configured to receive an electrical current on line L01 from an external electrical circuit 25, for example. The path of least resistance 107 may begin with node N01. Hence, node N01 may also be referred to as an input or path input. The electrical current at node N01 may propagate along line L02 and to switch SW1. As the electrical current propagates through switch SW1, the electrical current propagates along line L04 to node N20, for example. Switch SW1 includes an output terminal T01.

In the closed-circuit condition, representative switching arm A1 of switch SW1 is oriented so that an electrical current flowing on line L02 passes through switch SW1 to line L04 also part of the path of least resistance 107. The switch arm A1 is for illustrative purposes and not meant to limit the configuration or operation of the switch SW1 in any way. The path of least resistance 107 continues from node N20 to the output at node N30. Node N20 may provide a bypass path from node N01 on an input side of switch SW1 to the second output side of switch SW1 in-line with node N20 on the path of least resistance 107.

The bypass power switch device 201 is a bi-directional bypass switch circuit, denoted in a dashed box positioned below the path of least resistance 107 and is configured to interrupt the fault current of the fault event. From node N01, the electrical current may propagate in the direction of arrow 109A to bi-directional bypass switch circuit (i.e., power switch device 201) along line L12 to node N03, such as when switch SW1 is "OPEN."

The electrical current on line L12 may propagate in the direction of arrow 109B to a first insulated gate bipolar transistor (IGBT) transistor 203 connected to a second IGBT transistor 205. IGBTs 203 and 205 may be a pair of IGBTs such that the emitters of IGBTs 203 and 205 are tied together. A first side of voltage-dependent resistor (VDR) or varistor 213 and a first side of the IGBTs 203 and 205 are connected to node N03. Specifically, the collector of IGBT 203 is connected to the first side of varistor 213. A second side of the IGBTs 203 and 205 is connected to node N13 where a second side of varistor 213 is also connected to node N13. Specifically, the collector of IGBT 205 is connected to node N13. Node N13 is adjacent to node N16.

A third IGBT transistor 207 is connected to a fourth IGBT transistor 209. IGBTs 207 and 209 may be a pair of IGBTs such that the emitters of IGBTs 207 and 209 are tied together. A first side of voltage-dependent resistor (VDR) or varistor 215 and a first side of the IGBTs 207 and 209 are connected to node N16. Specifically, the collector of IGBT 207 is connected to the first side of varistor 215. A second side of the IGBTs 207 and 209 is connected to node N18 where a second side of varistor 215 is also connected to node N18. Specifically, the collector of IGBT 209 is connected to node N18. Line L16 extends from node N18 to node N20 on the path of least resistance 107 where node N20 is between the output terminal T01 of switch SW1 and the path output (i.e., node N30), by way of example. In the bypass power switch device 201 current can flow in the direction of arrow 109C to node N20, such as when the electro-mechanical switching device 210 is in an open condition. Although this description indicates that IGBTs will be used, in some embodiments other types of transistors may be used.

The bypass power switch device 201 can have two pairs of the transistors, as illustrated in FIGS. 2A-2B. The bypass power switch device 201 may be configured with multiple pairs of transistors.

The IGBTs may be substituted with metal oxide silicone field effect transistors (MOSFETs) or junction gate field effect transistors (JFET) or other semiconductor power electronic switching devices.

Current sensor 270 is downstream of switch SW1 in proximity to the node N30, sometimes referred to as the "output" or "path output." Current sensor 270 is configured to sense an amount of current on line L25. Current sensor 270 is in electronic communication with or electrically connected to controller 250 and may deliver a sensed current signal on line 275 representative of a measure of electric current on line L25. In other variations, the sensed current signal may produce a (first) fault detection signal, which is communicated to the controller 250 when the sensed signal is at a predefined threshold that would cause injury to personnel 20.

Figure 3:
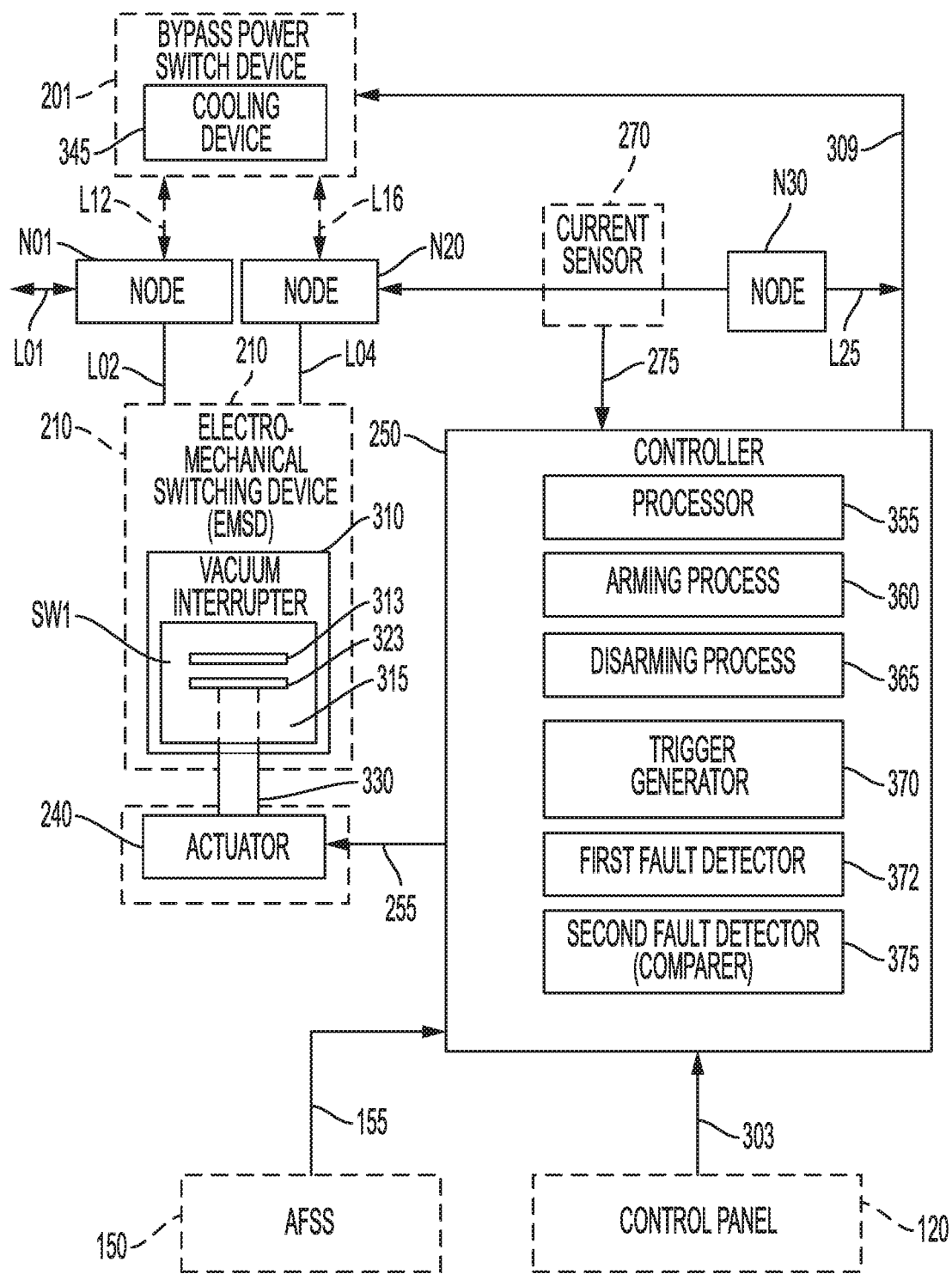
FIG. 3 illustrates a block diagram of a controller of the arc flash mitigation device of FIGS. 2A-2B interfaced with components of the hybrid arc flash mitigation system.

FIG. 3 illustrates a block diagram of a controller 250 of the arc flash mitigation device 100 of FIGS. 2A-2B interfaced with components of the device. Controller 250 is in electrical communication or connected with control panel 120 to receive a first control signal on line 303. For example, personnel 20 may place arc flash mitigation device 100 in the normal mode of operation in response to the first control signal generated by control panel 120. The normal mode of operation corresponds to the arc flash reduction maintenance mode being "OFF," thus the controller 250 sets the switch SW1 to the closed-circuit condition. Controller 250 may be responsive to control buttons 132 and 134 such as for arming and disarming, respectively, arc flash mitigation device 100.

Arming the arc flash mitigation device 100 turns "ON" the arc flash reduction maintenance mode such that the switch SW1 is set to the open-circuit condition.

Control panel 120 may generate the first control signal on line 303 to cause controller 250 to control the operational mode of device 100. The line 303 may be connected to a control panel input or port of controller 250. The signals received on the control panel input or port of controller 250 controls the operation (arm process or disarm process) of the controller. Thus, the control panel may generate disarming control signal to disarm device 100 and an arming control signal to arm arc flash mitigation device 100. Controller 250 may be powered although device 100 is disarmed, as the disarmed mode generally changes the condition of the switch SW1.

Specifically, for the normal mode of operation, the controller 250 may cause switch SW1 to transition to the closed-circuit condition as shown in FIG. 2A, represented as switch arm A1 connected to the output terminal T01. Arrow 101 represents the normal current flow through the arc flash mitigation device 100 when switch SW1 is set to the closed-circuit condition of the normal mode of operation. Accordingly, the path of least resistance 107 extends from node N01 to node N30 without an open-circuit condition. Controller 250 may send control signals in some embodiments on at least one control line 309 to control bypass power switch device 201 to switch to "OFF." Furthermore, controller 250 may control active cooling device 345 of the bypass power switch device 201, if present. Control panel 120 may generate a second control signal on line 303 to cause controller 250 to control the operational mode of device 100 to cause switch SW1 to "OPEN," as best seen in FIG. 2B, such that device 100 becomes armed. In other words, the switch SW1 has an open-circuit condition represented as switch arm A1 being lifted in a direction away from terminal T01.

Controller 250 may include at least one processor 355. Hardware details of controller 250 will be described in more detail in relation to FIG. 8. Controller 250 may also include hardware, software and/or firmware for performing an arming process 360 and a disarming process 365. The disarming process 365 configures arc flash mitigation device 100 to operate according to the normal mode of operation, as shown in FIG. 2A and described above. For example, the disarming process 365 may cause controller 250 to control switch SW1 to "CLOSE" or transition to a closed-circuit condition in response to the control signal on line 303.

The disarming process may cause the arc flash reduction maintenance mode to be switched "OFF." Additionally, switch SW1 may be set to be in a "CLOSE" position and the bypass power switch device 201 can be either in an "OFF" state or in an "ON" state. In various embodiments, the bypass power switch device 201 may remain in an "ON" state when the arc flash reduction maintenance mode is "OFF."

Arming process 360 may cause controller 250 to control switch SW1 to "OPEN" or transition to an open-circuit condition relative to the path of least resistance 107 in response to a second control signal on line 303. Switch SW1, when "OPEN" relative to the path of least resistance 107, is represented as switch arm A1 lifted away from terminal T01. Switch SW1 has a low on-resistance. Arming process 360 may also cause controller 250 to set or reset ultra-fast actuator 240 and may cause the arc flash reduction maintenance mode to be turned "ON." In some embodiments, the arming process 360 may engage switch SW1 which may be part of a vacuum interrupter 310, in some embodiments, to cause contacts 313 and 323 to separate from each other or "OPEN" the switch SW1. The vacuum interrupter 310 may include a vacuum chamber 315, such as in a ceramic bottle, where an arc is drawn by separating contacts 313 and 323. When actuator 240 is reset, linkage 330 and actuator 240 are configured to maintain contacts 313 and 323 electrically open. Device 100 is also capable of reuse under control of controller 250 after an arc flash event is detected and cleared.

Controller 250 may also include a trigger generator 370, a first fault detector 372, and a second fault detector (comparer) 375, which may include hardware, software and/or firmware. While arc flash mitigation device 100 is armed, first fault detector 372 may determine that a fault signal on line 155 has been received from arc flash sensor system 150. The signal on line 155 may be connected to an input or port of controller 250. Detection of fault signal on line 155 may cause controller 250 to trigger ultra-fast actuator 240 to cause contacts 313 and 323 (FIG. 3) of switch SW1 to separate from each other to form a gap therebetween. In various embodiments, when the switch SW1 is "CLOSED" and the bypass power switch device 201 is in the "ON" state, for example, controller 250, although disarmed from the arc flash reduction maintenance mode, is still operational to trigger the actuator 240 to cause switch SW1 to "OPEN," in response to a fault event detected by at least one of first fault detector 372 or a second fault detector (comparer) 375. Accordingly, when switch SW1 to "OPEN," the current of the fault event is commutated to the bypass power switch device 201 so that the fault event may be interrupted by the bypass power switch device 201.

The second fault detector (comparer) 375 may compare the signal received from sensor 270. The signal from sensor 270 may be representative of a high-current fault event. The (first fault) signal on line 275 may be connected to a sensor input or port of controller 250. Depending on the results of the comparison, trigger generator 370 may generate a trigger signal propagated along trigger conductor 255 to actuator 240. Specifically, the trigger signal may be communicated to ultra-fast actuator 240 to activate the actuator to cause the vacuum interrupter 310 to "OPEN" such that the electrical contacts 313 and 323 are forced "OPEN" by linkage 330. In FIG. 3, the contact 313 and 323 of switch SW1 are shown as "OPEN."

In some scenarios, the signal received by controller 250 from sensor 270 may be a fault signal representative of an arc flash event. The sensor 270 may send a measurement signal representative of the arc flash event. The fault signal and measurement signal may be configured to represent an overcurrent or overvoltage condition due to the detected arc flash event by the sensor 270. In some embodiments, second fault detector (comparer) 375 of controller 250 may compare the measurement signal with a threshold to detect the occurrence of the arc flash event. In either scenario, second fault detector (comparer) 375 may provide a control signal to the trigger generator 370 to cause a trigger signal to be generated.

In some embodiments, ultra-fast actuator 240 may include a Thompson coil actuator connected to linkage 330. The actuator 240 may include a piezo-electric actuator or other ultra-fast actuators. In operation, ultra-fast actuator 240 may receive a control (trigger) signal from controller 250 to cause the actuator 240 to activate. Actuator 240 when activated produces a fast acting force to be applied on linkage 330 that in turn forces contacts 313 and 323 (i.e., switch SW1) in vacuum interrupter 310 to separate.

Electro-mechanical switching device 210 when "OPEN" allows the fault current of the fault event to commutate to the bypass power switch device 201 in the current path of the electric circuit 35 downstream. The current commutation can happen either by using a high frequency electronic oscillation circuit (not shown) or by an arc voltage across the contact gap between contacts 313 and 323 when the contacts 313 and 323 separate while carrying current. The fault event or fault current is fully commutated to the power electronic current path through bypass power switch device 201 within tens of microseconds. The contacts 313 and 323 are forced to reach the minimum contact gap to withstand a transient recovery voltage (TRV). Thus, the fault current will be interrupted by bypass power switch device 201 and stop or eliminate the arc flash event. All this (e.g., opening the switch SW1 and interrupting the fault current of the fault event by the bypass power switch device 201) is configured to happen within about 0.5 ms or less. In other words, the response time is approximately 0.5 ms or less.

Bypass power switch device 201 may have a cooling device 345 configured to perform passive cooling or active cooling. In embodiments where the cooling device 345 performs active cooling, fans may be used for cooling. For passive cooling, the cooling device 345 may include a heat sink. When fans are used, when the arc flash mitigation device 100 is armed or when the bypass power switch device 201 is set to "ON," the active cooling devices are also turned "ON," as well. Controller 250 may provide additional control signals to electro-mechanical switching device 210 and bypass power switch device 201.

If implemented in software, the functions of controller 250 may be stored as one or more instructions or code on a computer-readable medium and executed by a hardware-based processing unit. Computer-readable media corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors 355, such as one or more digital signal processors (DSPs), general-purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. In addition, the techniques could be fully implemented in one or more circuits or logic elements.

Specifically, path of least resistance 107 has a first resistance. Switch SW1 has a low on-resistance. Switch SW1 has a closed position completing the path to output terminal T01. A path of least resistance 107 has an input (i.e., node N01) and an output (i.e., node N30) with switch SW1 between the input (i.e., node N01) and output (i.e., node N30). Electro-mechanical switching device 210 has an open-circuit condition when the switch SW1 is in an open-circuit condition position. The bi-directional bypass power switch device 201 is electrically connected to the path of least resistance 107 at a first location associated with the input (i.e., node N01) and at a second location between the switch SW1 and the output (i.e., node N30).

When bi-directional bypass power switch device 201 is "ON" and switch SW1 is "OPEN," power switch device 201 is configured to pass an electrical current originating at node N01 or the input to node N30 or the output. Bi-directional bypass power switch device 201 is also configured to pass an electrical current originating at node N30 or the output to node N01 or the input. In the scenario that a fault event is experienced when the arc flash reduction maintenance mode is "ON," bi-directional bypass power switch device 201 protects maintenance personnel by interrupting the fault current of the fault event. Alternately, any current from line L25 to node N20 may be propagated through bi-directional bypass power switch device 201.

When bi-directional bypass power switch device 201 is "ON" and switch SW1 is "CLOSED," controller 250 is configured to, in response to receiving a signal representative of a fault event, generate a trigger signal to actuator 240 to interrupt an arc flash event or high-current fault event by opening switch SW1 so that the fault current of the fault event is interrupted by bypassing a portion of the path of least resistance and channeling the fault current at node N20 to bi-directional bypass power switch device 201. Again, any current from line L25 to node N20 may be propagated through bi-directional bypass power switch device 201 and interrupted so that the fault event is stopped.

If the arc flash reduction maintenance mode is turned on in which switch SW1 is already "OPEN", for example, then when the fault current reaches 2× or 2.5× the rated current, the bi-directional power electronic switch 201 will interrupt the fault current within 100 μs. The arc flash energy is associated with the arc flash event and may be described as the fault current multiplied by the arc voltage.

The solid-state design can be packaged into the same form factor as a molded case circuit breaker (MCCB) or an air circuit breaker (ACB) so that retrofit in existing switchgear, switchboard or panelboard, for example, as will be discussed in relation to FIGS. 4A-4C, 6A-6B and 7.

Figure 4A:
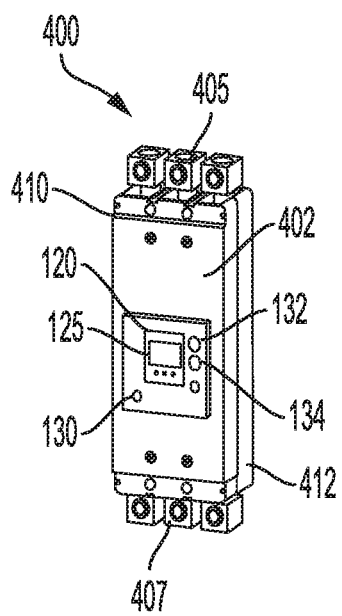
FIG. 4A illustrates a front perspective view of an arc flash mitigation device with a housing with a molded case circuit breaker (MCCB) form factor.
Figure 4B:
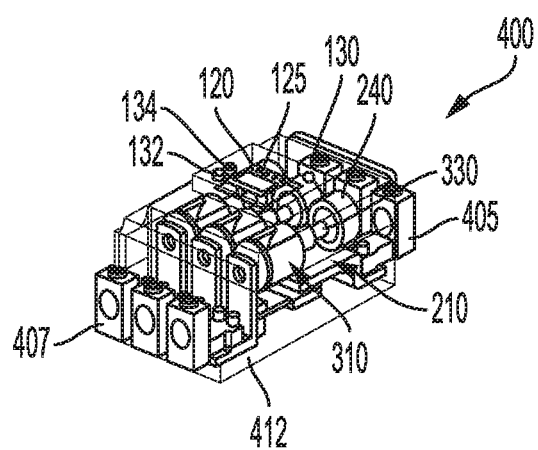
FIG. 4B illustrates an end and side perspective view of the arc flash mitigation device of FIG. 4A with a portion of the housing removed.
Figure 4C:
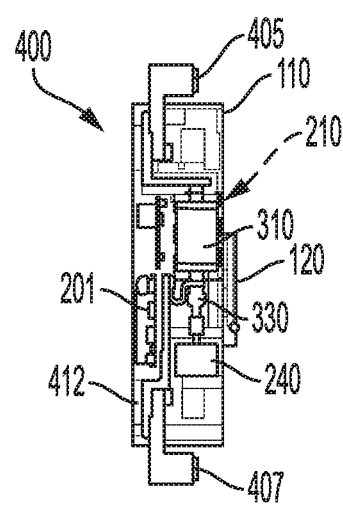
FIG. 4C illustrates a side view of the arc flash mitigation device of FIG. 4A with a portion of the housing removed.
Figure 5:
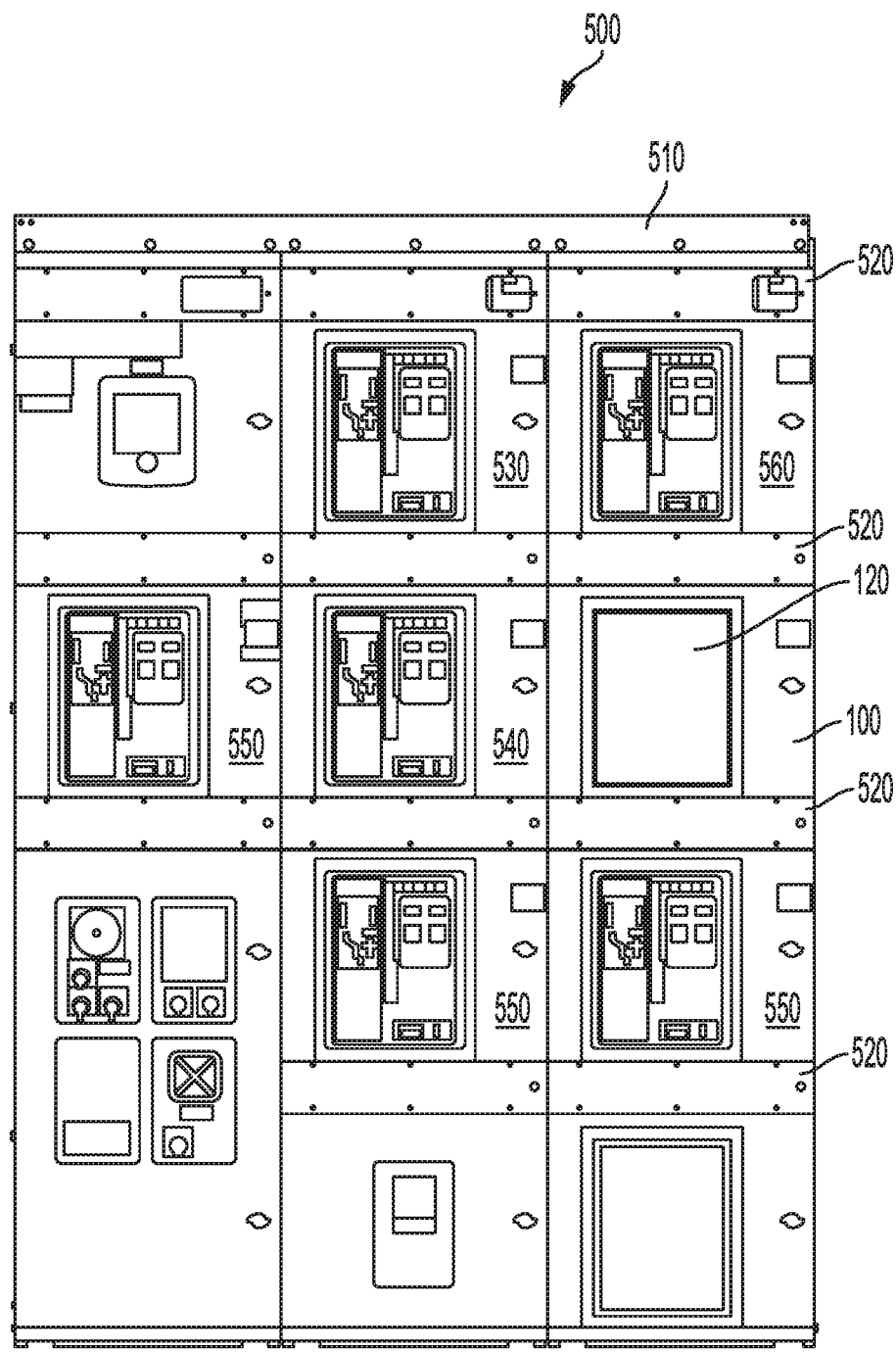
FIG. 5 illustrates n example electrical switchgear configuration.

FIG. 4A illustrates a front perspective view of an arc flash mitigation device 400 with a housing with a MCCB form factor. Arc flash mitigation device 400 is the same as arc flash mitigation device 100 except details of the form factor of housing 410 will be described. Housing 410 may include upper connectors 405 and lower connectors 407 for attaching cables or bus bars to conduct current from line side to load side electrical equipment, for example, or other electrical machine. A front panel or cover 402 of the housing 410 may have display panel 125, indicator 130 and control buttons 132 and 134 for easy access by personnel 20 (FIG. 1). However, it should be understood that control panel 120 may include other control buttons not described. FIG. 4B illustrates an end and side perspective view of the arc flash mitigation device 400 of FIG. 4A with a portion of the housing removed. FIG. 4C illustrates a side view of the arc flash mitigation device 400 of FIG. 4A with a portion of the housing removed. Housing 410 may locate bi-directional bypass power switch device 201 of protection electronic circuitry 105 adjacent a back panel 412 of housing 410. Back panel 412 may be mated and attached to a panel inside the switchgear 500 (FIG. 5). Electro-mechanical switching device 210 may include a vacuum interrupter 310. The ultra-fast actuator 240 is mechanically coupled to the vacuum interrupter 310 via a linkage 330. Electro-mechanical switching device 210 may have one end connected to a top end of housing 410. Arc flash mitigation device 400 may include a plurality of electro-mechanical switching devices 210 that are arranged in parallel for different poles. Each electro-mechanical switching device 210 is connected to its own actuator 240 via a linkage 330.

FIG. 5 illustrates example electrical switchgear 500 to which an arc mitigation device may be installed according to some embodiments. The switchgear 500 may be configured to receive a standard form circuit breaker. The switchgear 500 includes a housing 510 for housing a bus backplane assembly 520 mounted to the housing 510. The bus backplane assembly 520 may be configured to receive a circuit breaker, which may be electrically connected to buses of the bus backplane assembly 520 and arc flash mitigation device 100 housed in a housing with a compatible form factor and includes control panel 120. The switchgear 500 may house the arc flash sensor system 150.

Housing 510 may include cutouts sized to expose a front face of circuit breakers 550 installed in the bus backplane assembly 520. The housing 510 also includes the front face of circuit breakers 530, 540 and 560. Circuit breakers 530, 540 and 560 are the similar to circuit breakers 550 and will be described in more detail in relation to FIG. 9. As illustrated, according to some embodiments, an arc mitigation device 100 having a form factor substantially the same as a circuit breaker 550 may be installed in the panelboard 500, instead of a circuit breaker. The switchgear 500 is shown with cutouts of various sizes to accommodate other electronic devices.

Figure 6A:
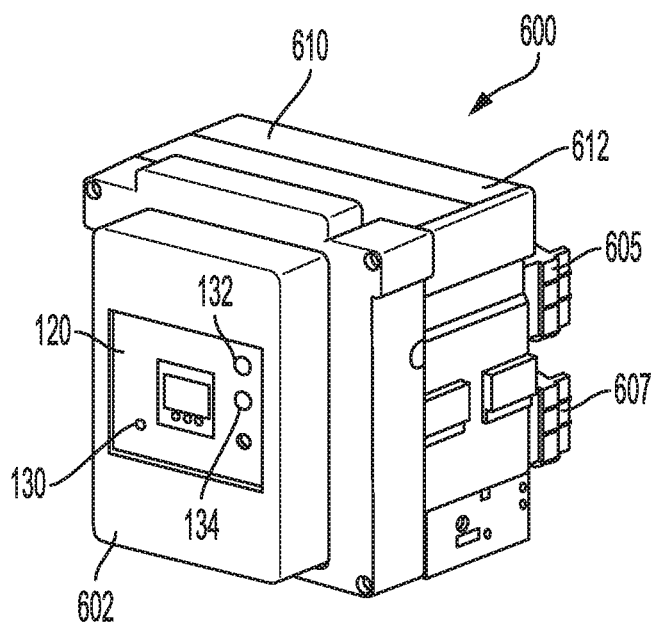
FIG. 6A illustrates a front perspective view of an arc flash mitigation device with a housing with an air circuit breaker (ACB) form factor.
Figure 6B:
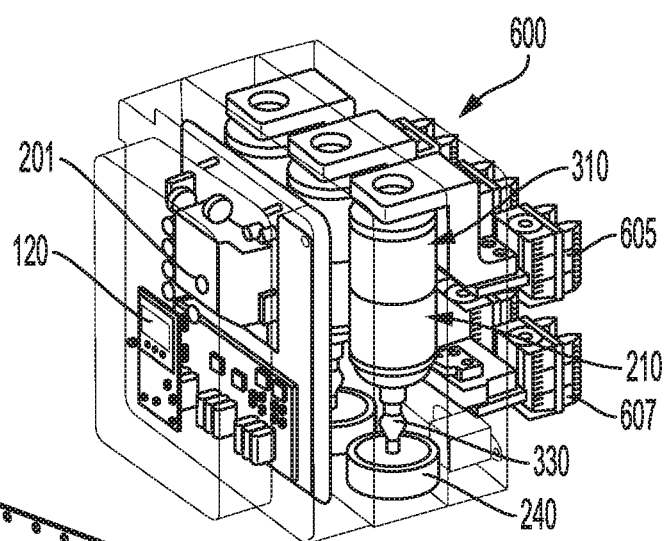
FIG. 6B illustrates a front perspective view of the arc flash mitigation device of FIG. 6A with a portion of the housing removed.

FIG. 6A illustrates a front perspective view of an arc flash mitigation device 600 with a housing with an air circuit breaker (ACB) form factor. Arc flash mitigation device 600 is the same, as arc flash mitigation device 100 except details of the form factor of housing 610 will be described. A front panel or cover 602 of the housing 610 may have mounted display panel 125, indicator 130 and control buttons 132 and 134 of the control panel 120 for easy access by personnel 20 (FIG. 1). Housing 610 may include a rear housing section 612 configured to be mated and attached to the front panel or cover 602. The rear housing section 612 may have mounted on a rear surface rear upper connectors 605 and rear lower connectors 607 for attaching housing 610 to bus bar connectors to conduct current from its line side to load side to downstream electrical equipment (FIG. 5), for example, or other electrical machine. FIG. 6B illustrates a front perspective view of the arc flash mitigation device 600 of FIG. 6A with a portion of the housing removed. The housing 610 may locate bi-directional bypass power switch device 201 of protection electronic circuitry 105 adjacent front panel 602 of housing 610. Electro-mechanical switching device 210 may include a vacuum interrupter 310 that is connected to a lower mounted ultra-fast actuator 240 via a linkage 330.

Figure 7:
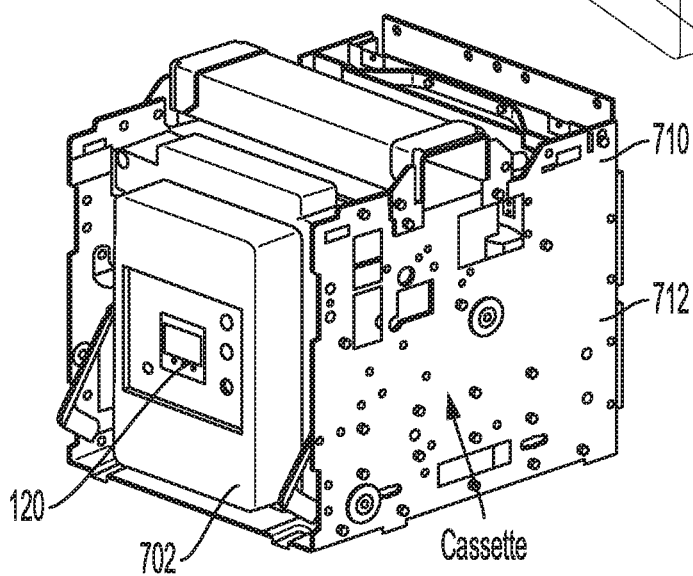
FIG. 7 illustrates a front perspective view of an arc flash mitigation device with a housing with an air circuit breaker cassette form factor.

FIG. 7 illustrates a front perspective view of an arc flash mitigation device 700 with a housing with an air circuit breaker cassette form factor. Arc flash mitigation device 700 is the same, as arc flash mitigation device 100 except details of the form factor of housing 710 will be described. A front panel or cover 702 of the housing 710 may have mounted display panel 125, indicator 130 and control buttons 132 and 134 of the control panel 120 for easy access by personnel 20 (FIG. 1). Housing 710 may include a rear housing section 712 configured to be mated and attached to the front panel or cover 702.

Figure 9:
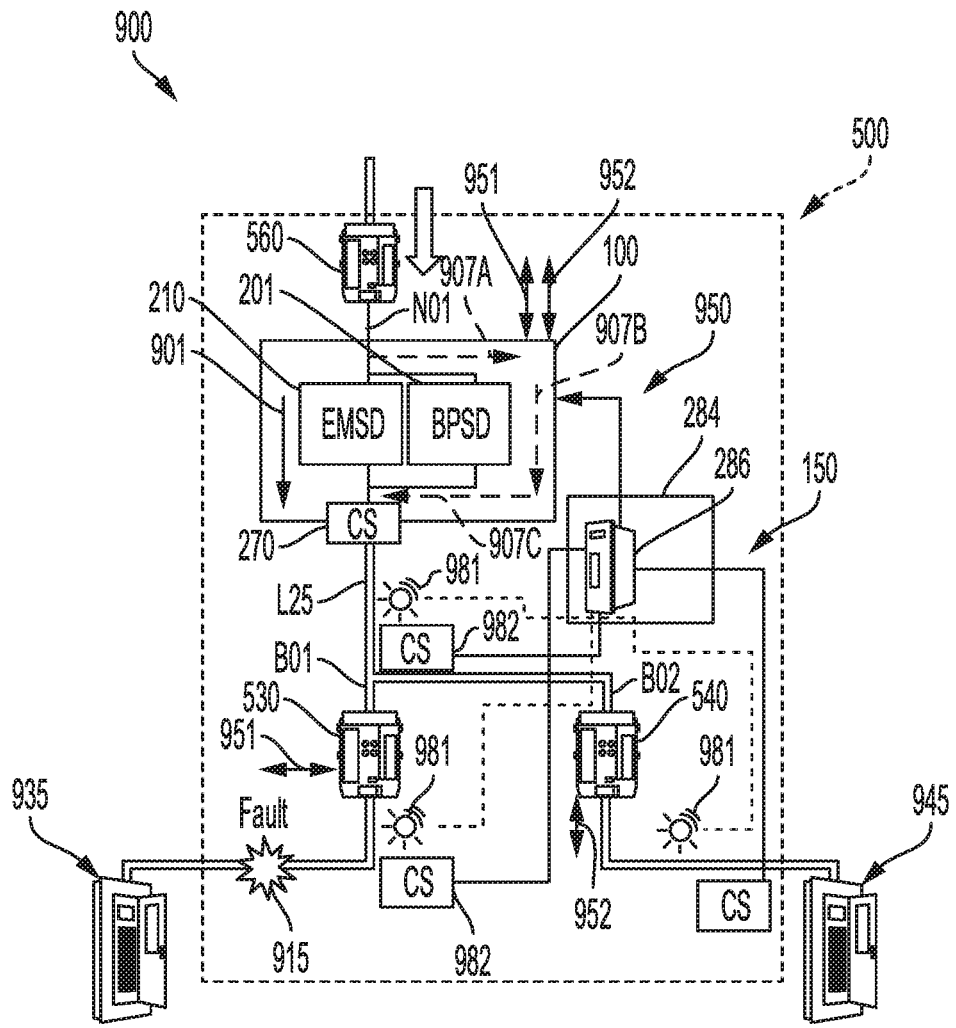
FIG. 9 illustrates a schematic diagram a system with a hybrid arc flash mitigation system used for multiple branch circuits in electric switchgear.

FIG. 9 illustrates a schematic diagram a system 900 with a hybrid arc flash mitigation system 950 (i.e., hybrid arc flash mitigation system 50) used for multiple branch circuits in electric switchgear 500. In this scenario, the electrical circuit 25 used by maintenance personnel is replaced by a main circuit breaker 560. The arc flash reduction maintenance mode is an arc flash reduction mode in this scenario.

The main circuit breaker 560 is coupled upstream of the node N01 and the arc flash mitigation system 100 (FIGS. 2A-2B) and provides alternating current (AC). When the main circuit breaker 560 is operational and the electro-mechanical switching device 210 is operating in the normal mode of operation (FIG. 2A), current flows in the direction of arrow 901 along line L25 and to branch circuits B01 and B02, as a non-limiting example. Alternately, when the main circuit breaker 560 is operational and the electro-mechanical switching device 210 is operating in an open-circuit condition (FIG. 2B), current flows in the direction of arrows 907A, 907B and 907C, denoted in dashed lines, through the bypass power switch device 201 to line L25. However, one or both of branches B01 and B02 may be operational. Once the electro-mechanical switching device 210 is switch to the open-circuit condition, the arc flash mitigation system 100 may transition into an arc flash mitigation mode of operation. Once the fault event is cleared, the arc flash mitigation system 100 may be reset to the normal mode of operation.

In operation, a high-current fault event detected by the current sensor (CS) 270 communicates a (first) fault signal on line 275 (FIG. 2A or 2B) representative of the measured amount of current to controller 250. A high-current fault may be considered to be a proxy (or an indicator of high risk of) for an arc flash event. If the electro-mechanical switching device 210 is operating in the normal mode of operation, the controller 250 triggers the bypass power electronic switch device 201 and actuator 240 (FIG. 2B) to cause an open-circuit condition in the bypass power switch device 201 and electro-mechanical switching device 210. Generally, the main circuit breaker 560 has a slower response time than the arc flash mitigation system 100. The faster response time of the arc flash mitigation system 100 may help prevent an explosion from occurring or severe electrical equipment damage in the event of fault events described herein.

For the sake of illustration, branch B01 includes a branch circuit breaker 530 that is in turn electrically connected to panel 935, such as for controlling a first set of electrical devices, such as lights, air conditioners, etc. Additionally, branch B02 includes a branch circuit breaker 540 that is in turn electrically connected to panel 945, such as for controlling a second set of electrical devices, such as lights, air conditioners, etc. In some embodiments, the controller 250 may also cause one or both of the branch breakers 530 and 540 to trip in the event of a high-current fault event sensed by current sensor 270 via control signals on communication medium 951 and 952 to interrupt the high-current fault event. As noted previously, a high-current fault event) corresponds to a detected or sensed current that is at least a specified multiple (such as 2×, 2.5× or 6×) the rated current of a downstream breaker or the main breaker, or of another component of the system. The response time of the bypass power switch device (BPSD) 201 may be between 100 μs and 0.5 milliseconds to interrupt a fault event—faster than that of the applicable downstream branch breaker or upstream main breaker. If a fault (e.g., 915) occurs downstream of one of the branch breakers (e.g., 530), then after the branch breaker 530 that is upstream of the fault 915 opens, the branch breaker may communicate to the controller 250 a reset signal via communication medium 951. This will reclose the electro-mechanical switching device 210 and permit current to flow to other branches of the circuit (such as that associated with branch breaker 540).

In operation, controller 250 is also responsive to the arc flash sensor system 150. The arc detection relay 286 of the arc flash sensor system 150 may have connected thereto the distributed sensors such as distributed light or optical sensors 981 and/or at least one of current sensors (CS) 982 along the branches. The current associated with an arc flash event may be higher than the high-current fault event. The arc detection relay 286 may be able to determine the location of the arc flash event such as in which branch or branch segment. Each branch or branch segment may have different sensors 981 and 982 so that the system can determine where the arc flash event occurred.

The plurality of distributed light or optical sensors 981 sense illumination of a flash of light representative of the arc flash event downstream of the path output along a plurality of circuit branches and generate arc sensing signals received by the arc detection relay 286. The flash sensor controller 284 is configured to process the received arc sensing signals, determine whether the arc flash event occurred based on the processed arc sensing signals, and generate a fault signal to the system controller 250, in response to a determination that the arc flash event (i.e., fault event) occurred.

For example, the arc flash sensor system 150 provides a fault signal to the controller 250 (FIG. 3), in response to detecting a fault event downstream of the arc flash mitigation device 100, such as associated with an arc flash event 915. The arc flash event 915 is shown occurring between the branch circuit breaker 530 and the panel 935. It should be understood, that the fault event can occur at other locations such as, without limitation, on line 25, branches B01 and B01 and between the circuit breaker 540 and panel 945.

The arc flash mitigation system 950 may cause its electro-mechanical switching device 210 to trip based on sensing a fault event by at least one of distributed optical sensors 981. The branch circuit breakers 530 and 540 also may be configured to trip independent of the arc flash mitigation device 100 in response to a fault event being detected. After the applicable branch circuit breakers 530 trips in response to detecting a fault event 915, the branch circuit breaker 530 may signal the arc flash mitigation device 100 on communication medium 951. The communication medium may be wired or wireless. The communication signals may be used to coordinate resetting and reclosing the electro-mechanical switching device 210, this allowing current to flow to other branches (such as circuit breaker 540).

In some scenarios, the branch circuit breaker 530 (or 540), if tripped by a sensed fault event, also transmits a notification via communication medium 951 (or 952) to the arc flash mitigation system 950 for display on the control panel 120 (FIG. 3). In the illustration, since the fault event 915 occurred between the branch circuit breaker 530 and the panel 935, the branch circuit breaker 540 may remain powered and receive current from the main circuit breaker 560 to power electrical circuits powered by panel 945.

In various embodiments, the system 900 may include a plurality of branch circuits downstream of the arc flash mitigation device 100, each of the branch circuits includes an associated circuit breaker, each of the circuit breakers is configured to open upon detection of a rated fault current, and each of the circuit breakers is configured to, after opening in response to detection of the rated fault current, send a reclose signal to the system controller. The system controller 250 is further configured to, upon receipt of a reclose signal from a circuit breaker: a) determine whether the arc flash event occurred downstream of the circuit breaker that sent the reclose signal; and b) upon confirming that the arc flash event occurred downstream of the circuit breaker that sent the reclose signal, trigger the actuator that causes the electro-mechanical switch to reclose.

In various embodiments, the system controller 250 is further configured to, upon receipt of a reclose signal from a circuit breaker: a) determine whether the location in the system was downstream of the circuit breaker that sent the reclose signal.

In various embodiments, the bypass power switch device 201 has a first response time between 100 microseconds and 0.5 milliseconds to interrupt the arc flash event or the high-current fault event. The system may include an electrical circuit, such as the main circuit breaker 560, upstream the arc flash mitigation device. The electrical circuit would have a second response time slower than the first response time of the bypass power switch device 201 to any arc flash event or high-current fault event and can be protected in the system by arc flash mitigation device 100 of the arc flash mitigation system 950.

Figure 8:
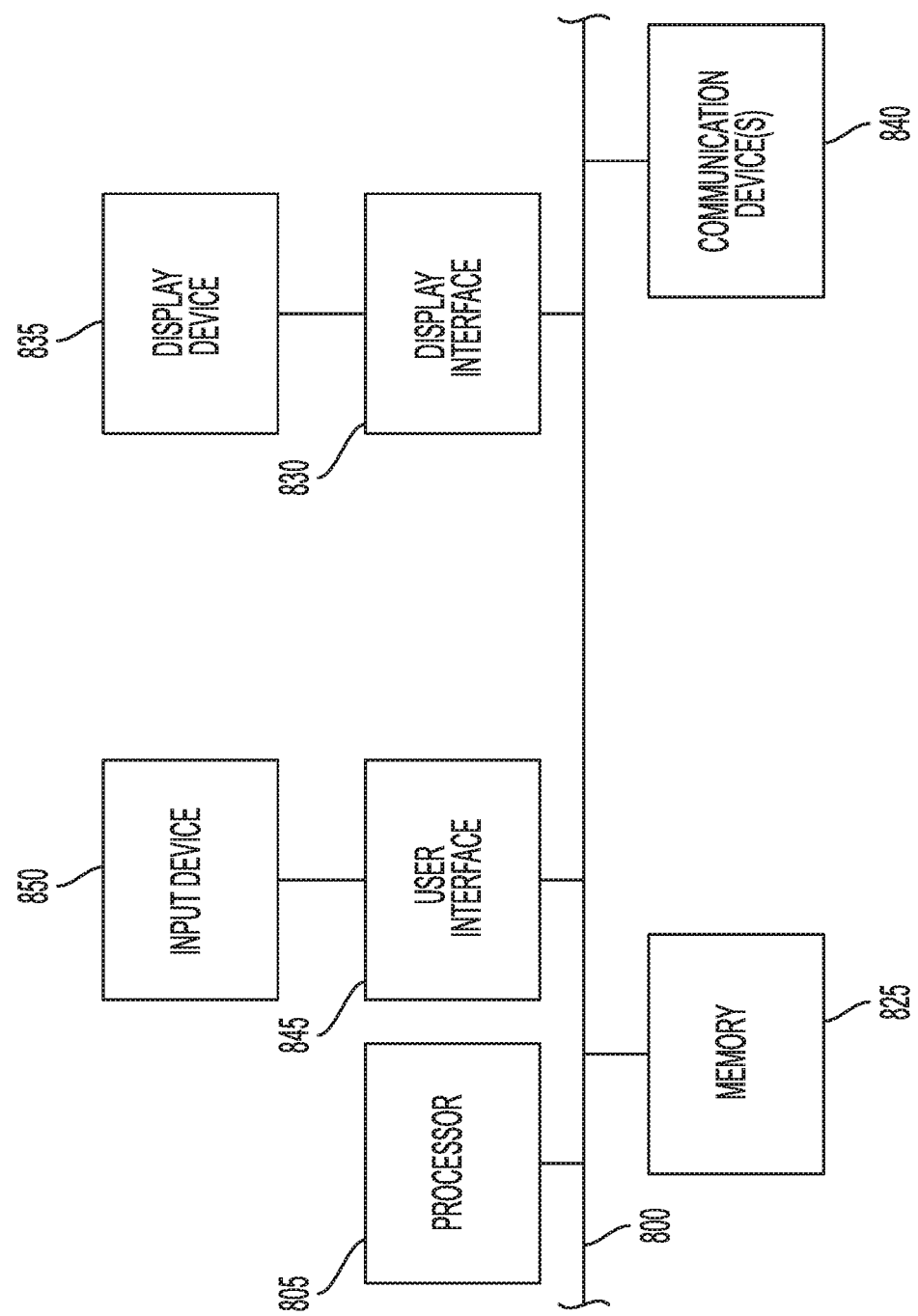
FIG. 8 depicts an example of internal hardware that may be included in any of the electronic components of the system, such as internal processing systems of computing devices, controllers and sensors.

FIG. 8 depicts an example of internal hardware that may be included in any of the electronic components of the system, such as controllers, sensors and computing devices. An electrical bus 800 serves as an information highway interconnecting the other illustrated components of the hardware. Processor 805 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a remote server, or a combination of these. Read only memory (ROM), random access memory (RAM), flash memory, hard drives and other devices capable of storing electronic data constitute examples of memory devices 825. A memory device 825 may include a single device or a collection of devices across which data and/or instructions are stored. Various embodiments of the invention may include a computer-readable medium containing programming instructions that are configured to cause one or more processors, print devices and/or scanning devices to perform the functions described in the context of the previous figures.

An optional display interface 830 may permit information from bus 800 to be displayed on a display device 835 (i.e., control panel) in visual, graphic or alphanumeric format. An audio interface and audio output (such as a speaker) also may be provided. Communication with external devices may occur using various communication devices 840 such as a wireless antenna, a radio frequency identification (RFID) tag and/or short-range or near-field communication transceiver, each of which may optionally communicatively connect with other components of the device via one or more communication system. Communication device(s) 840 may be configured to be communicatively connected to a communications network, such as the Internet, a local area network or a cellular telephone data network.

The hardware may also include a user interface sensor 845 that allows for receipt of data from input devices 850 such as a keyboard or keypad, a joystick, a touchscreen, a touch pad, a remote control, control buttons, a pointing device and/or microphone. The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

The terms "memory" and "computer-readable medium" each refer to a non-transitory device on which computer-readable data, programming instructions or both are stored. Except where specifically stated otherwise, the terms "memory" and "computer-readable medium (or media)" are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the term "communication line" means a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation. In addition, the terms "front" and "rear" are not necessarily limited to forward-facing or rear-facing areas but also include side areas that are closer to the front than the rear, or vice versa, respectively.

The invention claimed is:

1. A system comprising:
an arc flash sensor configured to detect an arc flash event; and
an arc flash mitigation device in communication with the arc flash sensor, the arc flash mitigation device comprising:
a path of least resistance having a path input and a path output, wherein the arc flash sensor is located downstream of the path output;
an actuator;
an electro-mechanical switch between the path input and the path output;
a bypass power switch device that comprises a solid-state circuit interrupter and that is configured to conduct current between the path input and the path output in response to an open-circuit condition of the switch; and
a system controller configured to generate a trigger signal to activate the actuator to generate the open-circuit condition of the electro-mechanical switch, which causes the bypass power switch device to interrupt a fault current associated with a fault event, in response to detection of the arc flash event by the arc flash sensor,
wherein:
the system controller is configured to control the bypass power switch device for a normal mode of operation, an arc flash reduction mode or both;

in the normal mode of operation, the electro-mechanical switch is set in a closed-circuit condition by the system controller; and in the arc flash reduction mode of operation, the electro-mechanical switch is set to an open-circuit condition and the bypass power switch device is in an "ON" state.

2. The system of claim 1, wherein:
the arc flash sensor comprises:
a plurality of sensors that include at least one optical sensor and at least one current sensor located downstream of the path output to detect the arc flash event; and the system further comprising a plurality of branch circuits, each branch circuit being monitored by at least one optical sensor and at least one current sensor.

3. The system of claim 2, wherein:
the arc flash mitigation device further comprises a current sensor coupled upstream the path output to detect a high-current fault event; and the system controller is also configured to generate a corresponding trigger signal to activate the actuator to generate the open-circuit condition of the electro-mechanical switch to cause the bypass power switch device to interrupt a fault current associated with the high-current fault event in response to detection of the high-current fault event by the current sensor of the arc flash mitigation device.

4. The system of claim 1, wherein the solid-state circuit interrupter of the bypass power switch device comprises:
a first transistor comprising an emitter;
a second transistor comprising an emitter connected to the emitter of the first transistor, the first transistor and the second transistor form a transistor pair; and
a first voltage-dependent resistor having a first side connected to a collector of the first transistor and a second side connected to a collector of the second transistor,
wherein the collector of the first transistor is connected to the path input.

5. The system of claim 4, wherein the solid-state circuit interrupter further comprises:
a third transistor comprising an emitter;
a fourth transistor comprising an emitter connected to the emitter of the third transistor, the third transistor and the fourth transistor form a second transistor pair; and
a second voltage-dependent resistor having a first side connected to a collector of the third transistor and a second side connected to a collector of the fourth transistor,
wherein:
the collector of the third transistor is connected to the collector of the second transistor, and
the collector of the fourth transistor is connected to the path of least resistance between the output terminal of the switch and the path output.

6. The system of claim 1, further comprising:
a housing for housing the electro-mechanical switch, the path of least resistance, the bypass power switch device and the system controller,
wherein the housing comprises a molded case circuit breaker or an air circuit breaker.

7. A system comprising:
an arc flash sensor configured to detect an arc flash event; and
an arc flash mitigation device in communication with the arc flash sensor, the arc flash mitigation device comprising:

a path of least resistance having a path input and a path output, wherein the arc flash sensor is located downstream of the path output;
an actuator;
an electro-mechanical switch between the path input and the path output;
a bypass power switch device that comprises a solid-state circuit interrupter and that is configured to conduct current between the path input and the path output in response to an open-circuit condition of the switch; and a system controller configured to generate a trigger signal to activate the actuator to generate the open-circuit condition of the electro-mechanical switch, which causes the bypass power switch device to interrupt a fault current associated with a fault event, in response to detection of the arc flash event by the arc flash sensor, wherein the arc flash mitigation device further comprises an electro-mechanical switch device that comprises the electro-mechanical switch,
wherein:
the electro-mechanical switch device comprises a vacuum interrupter; and
the actuator comprises a Thompson coil or piezoelectric actuator connected to the vacuum interrupter.

8. The system of claim 7, wherein the bypass power switch device also comprises a cooling device.

9. A system comprising:
an arc flash sensor configured to detect an arc flash event; and
an arc flash mitigation device in communication with the arc flash sensor, the arc flash mitigation device comprising:
a path of least resistance having a path input and a path output, wherein the arc flash sensor is located downstream of the path output;
an actuator;
an electro-mechanical switch between the path input and the path output;
a bypass power switch device that comprises a solid-state circuit interrupter and that is configured to conduct current between the path input and the path output in response to an open-circuit condition of the switch; and a system controller configured to generate a trigger signal to activate the actuator to generate the open-circuit condition of the electro-mechanical switch, which causes the bypass power switch device to interrupt a fault current associated with a fault event, in response to detection of the arc flash event by the arc flash sensor, wherein:
the system further comprises a plurality of branch circuits downstream of the arc flash mitigation device;
each of the branch circuits includes an associated circuit breaker;
each of the circuit breakers is configured to open upon detection of a rated fault current;
each of the circuit breakers is configured to, after opening in response to detection of the rated fault current, send a reclose signal to the system controller; and
the system controller is further configured to, upon receipt of a reclose signal from a circuit breaker:

determine whether the arc flash event occurred downstream of the circuit breaker that sent the reclose signal; and upon confirming that the arc flash event occurred downstream of the circuit breaker that sent the reclose signal, trigger the actuator that causes the electro-mechanical switch to reclose.

10. A method comprising:

protecting, by an arc flash mitigation device, at least one electrical circuit downstream or upstream the arc flash mitigation device, the arc flash mitigation device including an actuator, electro-mechanical switch in a path of least resistance between a path input and the path output and bypass power switch device that includes a solid-state circuit interrupter coupled to the path of least resistance;

detecting, by an arc flash sensor, an arc flash event downstream of the path output, wherein the arc flash sensor is in communication with the arc flash mitigation device;

triggering, by the arc flash mitigation device, the actuator to open the electro-mechanical switch in the path of least resistance in response to detection of the arc flash event by the arc flash sensor; and interrupting a fault current representative of the detected arc flash event by the bypass power switch device of the arc flash mitigation device, wherein the arc flash sensor comprises a plurality of optical sensors, each of which is associated with a branch circuit to sense an occurrence of illumination representative of the detected arc flash event at the associated branch circuit.

11. The method of claim 10, wherein:

the arc flash mitigation device comprises a current sensor connected upstream of the path output; and the protecting, by the arc flash mitigation device, further comprises:

detecting, by the current sensor a high-current fault event downstream of the path output, triggering, by the arc flash mitigation device, the actuator to open the electro-mechanical switch in the path of least resistance in response to detection of the high-current event by the current sensor of the arc flash mitigation device, and interrupting a fault current representative of the high-current fault event by the bypass power switch device of the arc flash mitigation device.

12. The method of claim 10, wherein:

the at least one electrical circuit is downstream and each electrical circuit includes a branch circuit with a circuit breaker; and the detecting, by the arc flash sensor, comprises detecting an occurrence of the arc flash event in any of the branch circuits.

13. The method of claim 10, wherein the arc flash sensor comprises a plurality of current sensors, each of which is associated with a branch circuit to sense an occurrence of the fault current representative of the detected arc flash event at the current sensor's corresponding branch circuit.

14. The method of claim 10, wherein the solid-state circuit interrupter of the bypass power switch device comprises:

a first transistor comprising an emitter;

a second transistor comprising an emitter connected to the emitter of the first transistor, the first transistor and the second transistor form a transistor pair;

a first voltage-dependent resistor having a first side connected to a collector of the first transistor and a second side connected to a collector of the second transistor; and the collector of the first transistor is connected to the path input.

15. The method of claim 14, wherein the solid-state circuit interrupter of the bypass power switch device further comprises:

a third transistor comprising an emitter;

a fourth transistor comprising an emitter connected to the emitter of the third transistor, the third transistor and fourth transistor form a second transistor pair;

a second voltage-dependent resistor having a first side connected to a collector of the third transistor and a second side connected to a collector of the fourth transistor;

the collector of the third transistor is connected to the collector of the second transistor; and the collector of the fourth transistor is connected to the path of least resistance between the output terminal of the switch and the path output.

16. The method of claim 10, wherein:

the arc flash mitigation device further comprises an electro-mechanical switch device that comprises the electro-mechanical switch;

the electro-mechanical switch comprises a vacuum interrupter with a vacuum chamber; and the actuator comprises a Thompson coil or piezo-electric actuator connected to the vacuum interrupter.

17. The method of claim 16, wherein:

the bypass power switch device comprises a cooling device; and the method further comprises cooling the bypass power switch device by the cooling device.

18. The method of claim 10, wherein the bypass power switch device has a response time between 100 microseconds and 0.5 milliseconds to interrupt the arc flash event.

* * * * *